United States Patent
Kim et al.

(10) Patent No.: US 8,949,144 B2
(45) Date of Patent: Feb. 3, 2015

(54) POS TERMINAL AND POS SYSTEM USING MOBILE TERMINAL

(75) Inventors: Jin Gwan Kim, Yongin-si (KR);
Young-Hwan Kwak, Gyeonggi-do (KR)

(73) Assignee: Bixolon Co., Ltd., Seongnam-si, Gyeonggi-do (KR)

( * ) Notice: Subject to any disclaimer, the term of this patent is extended or adjusted under 35 U.S.C. 154(b) by 121 days.

(21) Appl. No.: 13/473,678

(22) Filed: May 17, 2012

(65) Prior Publication Data
US 2013/0262248 A1 Oct. 3, 2013

(30) Foreign Application Priority Data
Mar. 30, 2012 (KR) .......................... 10-2012-0033384

(51) Int. Cl.
*G06Q 20/00* (2012.01)
*G06Q 30/00* (2012.01)

(52) U.S. Cl.
USPC ............................. 705/16; 705/17; 705/26.1

(58) Field of Classification Search
None
See application file for complete search history.

(56) References Cited

U.S. PATENT DOCUMENTS

| | | | | |
|---|---|---|---|---|
| 5,579,487 A | * | 11/1996 | Meyerson et al. | 710/100 |
| 5,933,812 A | * | 8/1999 | Meyer et al. | 705/15 |
| 6,101,483 A | * | 8/2000 | Petrovich et al. | 705/21 |
| 6,405,049 B2 | * | 6/2002 | Herrod et al. | 455/517 |
| 6,556,435 B1 | * | 4/2003 | Helot et al. | 361/679.45 |
| 6,587,835 B1 | * | 7/2003 | Treyz et al. | 705/14.64 |
| 7,040,541 B2 | * | 5/2006 | Swartz et al. | 235/472.02 |
| 7,414,443 B2 | * | 8/2008 | Jacobsson et al. | 327/116 |
| 7,753,269 B2 | * | 7/2010 | Russell et al. | 235/383 |
| 7,778,023 B1 | * | 8/2010 | Mohoney | 361/679.41 |
| D636,778 S | * | 4/2011 | Corsini et al. | D14/434 |
| 2005/0171997 A1 | * | 8/2005 | Seo et al. | 709/202 |
| 2007/0005685 A1 | * | 1/2007 | Chau et al. | 709/203 |
| 2012/0016758 A1 | * | 1/2012 | Bouaziz et al. | 705/17 |
| 2012/0066079 A1 | * | 3/2012 | Falzone et al. | 705/16 |
| 2012/0188689 A1 | * | 7/2012 | Leung | 361/679.01 |
| 2012/0189156 A1 | * | 7/2012 | Leung | 381/387 |
| 2013/0109253 A1 | * | 5/2013 | Gammon et al. | 439/883 |

* cited by examiner

*Primary Examiner* — Asfand Sheikh
(74) *Attorney, Agent, or Firm* — Novick, Kim & Lee, PLLC; Jae Youn Kim

(57) ABSTRACT

A point-of-sale (POS) terminal and a POS system, by which the cost spent for the establishment of the POS system is reduced. Ordering, payment and management of sales information can be conducted irrespective of location, thereby maximizing user convenience. The general functions of a POS terminal, such as barcode scanning, near-field communication (NFC), signing, and the like, can be performed based on a variety of functions of a mobile terminal in order to provide an optimum solution in any sales environment.

8 Claims, 7 Drawing Sheets

POS TERMINAL AND POS SYSTEM USING MOBILE TERMINAL

CROSS REFERENCE TO RELATED APPLICATION

The present application claims priority from Korean Patent Application Number 10-2012-0033384 filed on Mar. 30, 2012, the entire contents of which application are incorporated herein for all purposes by this reference.

BACKGROUND OF THE INVENTION

1. Field of the Invention

The present invention relates to a point-of-sale (POS) terminal and a POS system using a mobile terminal, and more particularly, to a POS terminal and a POS system, by which the cost spent for the establishment of the POS system is reduced, and ordering, payment and management of sales information can be conducted irrespective of location, thereby maximizing user convenience, and the general functions of a POS terminal, such as barcode scanning, near-field communication (NFC), signing, and the like, can be performed based on a variety of functions of a mobile terminal in order to provide an optimum solution in any sales environment.

2. Description of Related Art

In general, a point-of-sale (POS) system refers to a system that is installed at the checkout of a retailer, such as a big-box store, a supermarket, or a convenience store, in order to record the result of the sale of products. This system processes data involving the sale of products at the point of sale. The POS system is also generally referred to as a "POS information management system."

The POS system is a system that records information about a product that is sold, immediately at the point of sale, in order to centrally manage sales information. The POS system is a total sales management system, in which a demand-processing system provided in a store and a main computer of an operator are electronically connected to each other in order to combine, synthesize, and evaluate information at the point of sale in real-time, thereby enhancing the ability to deal with customers.

Specifically, the POS system reads barcodes, OCR tags (i.e. price tags for an optical character recognition (OCR) device) or the like, which are attached to products, using a scanner in order to automatically calculate prices while collecting and inputting all information about products. This system performs a key role in enabling store automation in the retail industry, including department stores, banks, large bookstores, etc. Since various kinds of sales information can be systematically managed, stock can be advantageously maintained at a suitable amount. POS data collected in this way make it possible to grasp the sales trend of new products and sales hooks, the trend of hot items and dead items, which have not been sold, the sales trend of imitations and competitive items, analysis based on customer demographics, analysis based on time, correlative analysis between the price and the amount of sales, the state of exhibition, the effect of advertising in the mass media, and the like, so that plans for manufacturing, sales and advertising can be established.

However, since the POS system of the related art is connected to a computer for use, it can be used only in a fixed position, but is not easy to move or carry. Because of such problems, a payment system using a personal digital assistant (PDA) has been provided recently.

Significantly large expense is spent for establishing a POS system, and management expenses are continuously incurred, thereby increasing the cost of operation and maintenance. Since the POS system is bulky and heavy, it is difficult to carry it, and thus must be furnished in a fixed position for use. That is, the POS system has the problem of being limited to use in particular places.

Therefore, small stores or those who conduct business or sales out of stores do not use a general POS system, which is problematic.

That is, the installation of the POS system is a burden since it is expensive, and the POS system is not readily adapted to the mobile environment of a user. Therefore, there is the demand to solve these problems.

Recently, the use of mobile terminals, such as a tablet personal computer (PC) and a smart-phone, has been maximized, and their performance has also grown to the level of the performance of a fixed computer, a notebook computer, or the like. In addition, new mobile terminals are becoming inexpensive compared to existing products, and provide an environment that a user can easily use while moving. Therefore, there is continuous demand for the study and development of a new POS system that makes the best use of such advantages and overcomes the drawbacks of traditional POS systems.

CITATION LIST

Korean Registered Utility Model No. 0369021 (Nov. 20, 2004)

Korean Patent Application Publication No. 2007-0014380 (Feb. 1, 2007)

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention are intended to reduce the costs spent for the establishment of a point-of-sale (POS) system, and enable ordering, payment and management of sales information to be conducted irrespective of location, thereby maximizing user convenience.

Also intended is to enable the general functions of a POS terminal, such as barcode scanning, near-field communication (NFC), signing, and the like, based on a variety of functions of a mobile terminal, in order to provide an optimum solution in any sales environment.

Also intended is to enable a manager to take orders while moving around a store and to conveniently conduct sales history management while he/she is moving or from other places out of the store, and to enable efficient power supply using a docking station.

In an aspect of the present invention, provided is a POS terminal, including a mounting means, which includes a guide panel, by which a mobile terminal, such as a tablet personal computer or a smart phone, is mounted on the mounting means, and a fixing cover, which prevents the mobile terminal from being lost or stolen; a docking station, which includes a connector and a coupling recess, by which the mounting means is separably coupled to the docking station, a power connection, by which power is supplied to the mobile terminal, and a connecting recess to which a display section is connected, the inside of the docking station being configured such that the docking station interworks with the mobile terminal via wires or wirelessly so that payment processing is performed; and the display section separably connected to the docking station. The display section displays a receipt that is issued when the payment processing is performed via the mobile terminal, outputs various types of advertisement, and acts as a signature pad on which a person who pays is to sign.

In an exemplary embodiment, the mounting means may include a coupling protrusion, which is to be coupled to a coupling recess formed in the docking station, and an insert recess, into which a connector formed in the docking station is to be inserted.

In an exemplary embodiment, the docking station may further include a height-adjusting means for enabling the height of the mounting means to be adjusted, the height-adjusting means including a hinge plate, a hinge provided on the hinge plate, and a support, which is fitted into a receiving means of the mounting means so as to support the mounting means.

In an exemplary embodiment, the docking station may further include a control section, which interworks with the mobile terminal via at least one of wired communication and wireless communication, collects information necessary for the payment processing, outputs the collected information, approves payment, and stores payment data; a wired/wireless communication section, whereby wireless communication via a wireless data network or a wireless sharing device or wired communication is established between the control section and the mobile terminal, a payment server, in which the payment is approved, or a data backup server, in which the payment data is stored; a power supply, which supplies electric power to the mobile terminal; a speaker, which outputs an audio signal that is transferred to the docking station via the mobile terminal; and a universal serial bus (USB) hub chipset, which includes an upstream universal serial bus port as an upstream communication path and a downstream USB port as a downstream communication path. A peripheral device, such as a display device, a barcode scanner, a card reader or a printer, is connected to the USB hub chipset.

In an exemplary embodiment, the display section may include a liquid crystal display (LCD) panel, which is configured as an electrostatic touch screen, and a protective cover, which protects the LCD panel, and connects the LCD panel to the control section of the docking station.

In an aspect of the present invention, provided is a POS system, including a docking station to which a mobile station is mounted; an external device, which includes a USB hub chipset and peripheral devices, which are connected to the docking station; a payment server, which receives payment data from the docking station via a network, and verifies the payment data so that payment is approved; and a data backup server, which interworks with the payment server via the network, and stores therein payment data provided from the payment server.

In an exemplary embodiment, the docking station may include a control section, which interworks with the mobile terminal via at least one of wired communication and wireless communication, collects information necessary for the payment processing, outputs the collected information, approves the payment, and stores payment data; a wireless communication section, whereby the control section establishes wireless communication with the mobile terminal or the data backup server via a wireless data network; a wired communication section, whereby the control section establishes wired communication with the data backup server or the payment server via the network; a power supply, which is connected to an external power supply in order to supply electric power to the docking station and to the mobile terminal; and a USB hub chipset, which includes an upstream USB port as an upstream communication path and a downstream USB port as a downstream communication path.

In an exemplary embodiment, the docking station may be enabled to perform wired/wireless communication with the mobile terminal in order to input and output data to and from the mobile terminal. The docking station may include a data storage section, which stores the payment data therein, and a memory section, which enables the control section to efficiently process data.

In an exemplary embodiment, the docking station may include a speaker, which outputs an audio signal that is transferred to the docking station via the mobile terminal.

In an exemplary embodiment, the POS system may further include a peripheral device, which is connected to the docking station via the USB hub chipset. The peripheral device includes a display device, which displays a receipt or outputs an advertisement or a breakdown of transaction, or into which a signature is input; a barcode scanner, which scans barcodes that contain information about a product; an electronic signature device, which receives a signature that is input from a user; a card reader, which receives card information so that payment is made; and a printer, which prints the receipt, the information about a product, or print data provided from the control section, the data storage section and the data backup server.

In an exemplary embodiment, the mobile terminal may be connected to a network via a wireless sharing device or be wirelessly connected to a wireless data network, so as to output an advertisement provided from the Internet or a communication provider, is provided with a program that is intended to realize the POS system, such as a POS application, and interworks with the control section of the docking station in order to realize the POS system.

According to embodiments of the invention, it is possible to reduce the costs spent for the establishment of a POS system, and enable ordering, payment and management of sales information to be conducted irrespective of location, thereby maximizing user convenience.

In addition, it is possible to enable the general functions of a POS terminal, such as barcode scanning, NFC, signing, and the like, based on a variety of functions of a mobile terminal, in order to provide an optimum solution in any sales environment.

Furthermore, it is possible to enable a manager to take orders while moving around a store and to conveniently conduct sales history management while he/she is moving or from other places out of the store, and to enable efficient power supply using a docking station.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
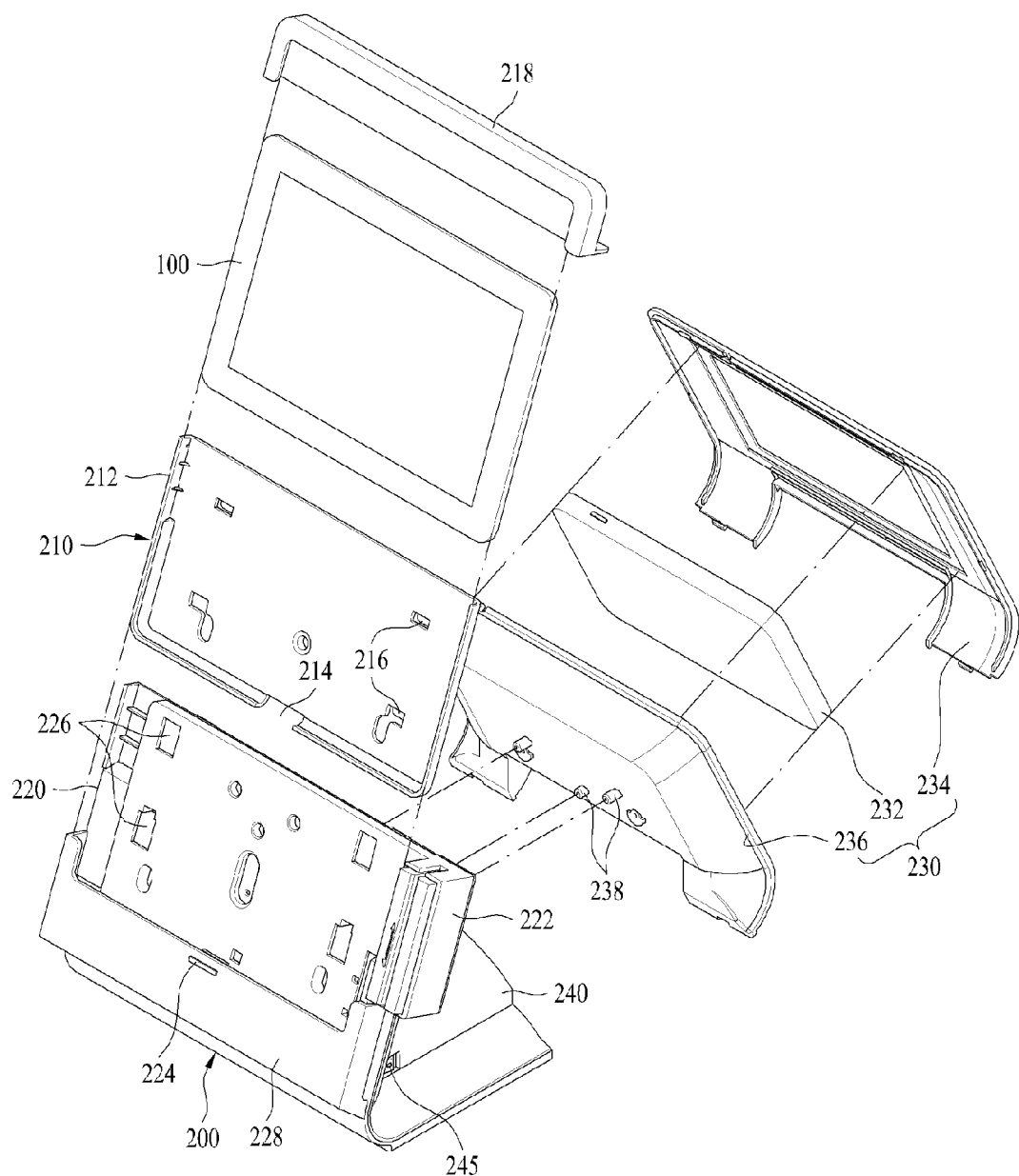
FIG. 1 is an exploded perspective view depicting a point-of-sale (POS) terminal using a mobile terminal according to an exemplary embodiment of the invention.

Reference will now be made in detail to various embodiments of the present invention, examples of which are illustrated in the accompanying drawings and described below. Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Figure 2:
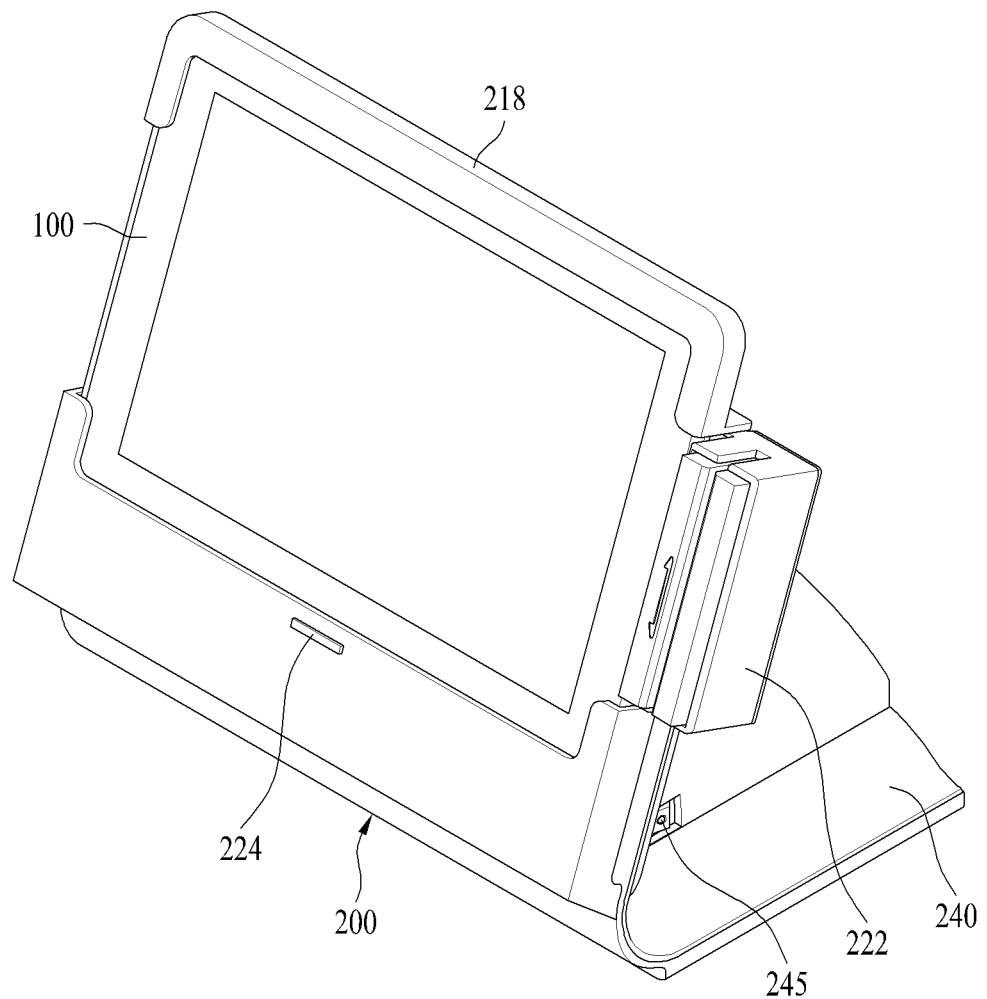
FIG. 2 is an exploded perspective view depicting the POS terminal using a mobile terminal according to an exemplary embodiment of the invention.
Figure 3:
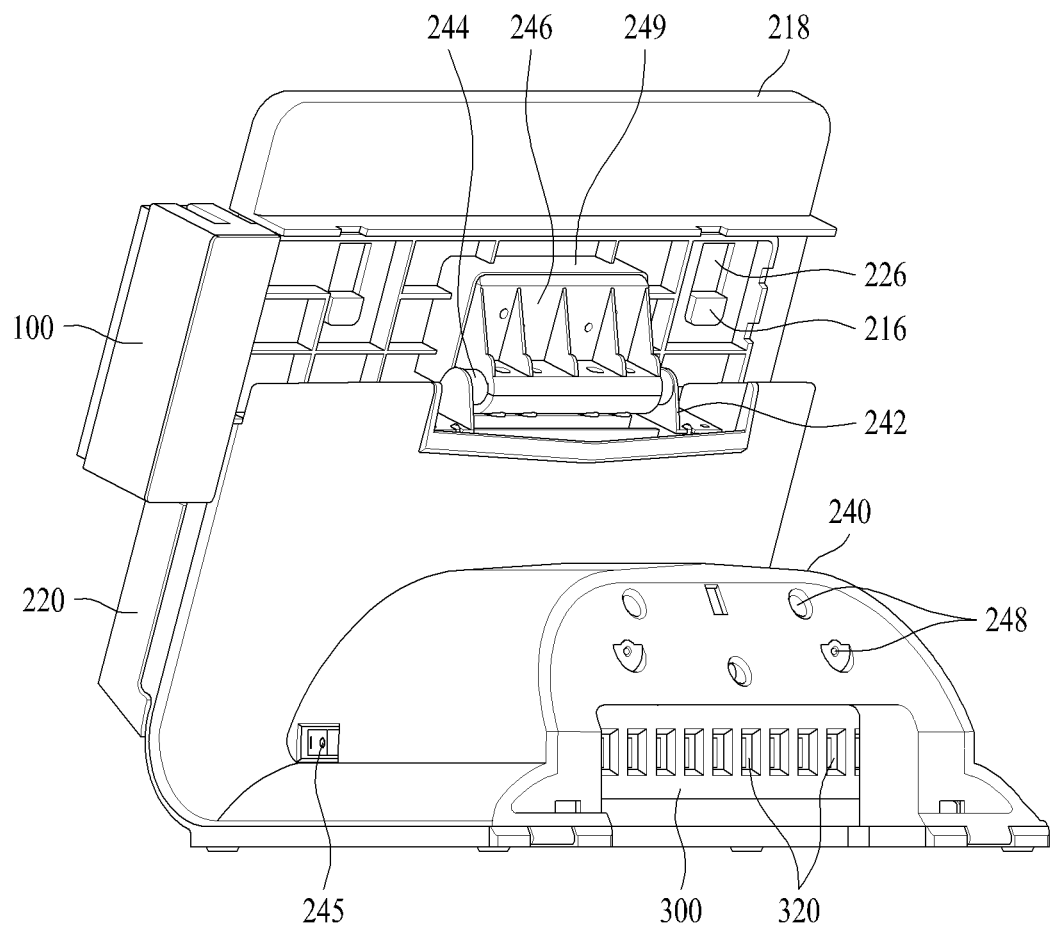
FIG. 3 is a rear perspective view depicting the POS terminal using a mobile terminal according to an exemplary embodiment of the invention.
Figure 4A:
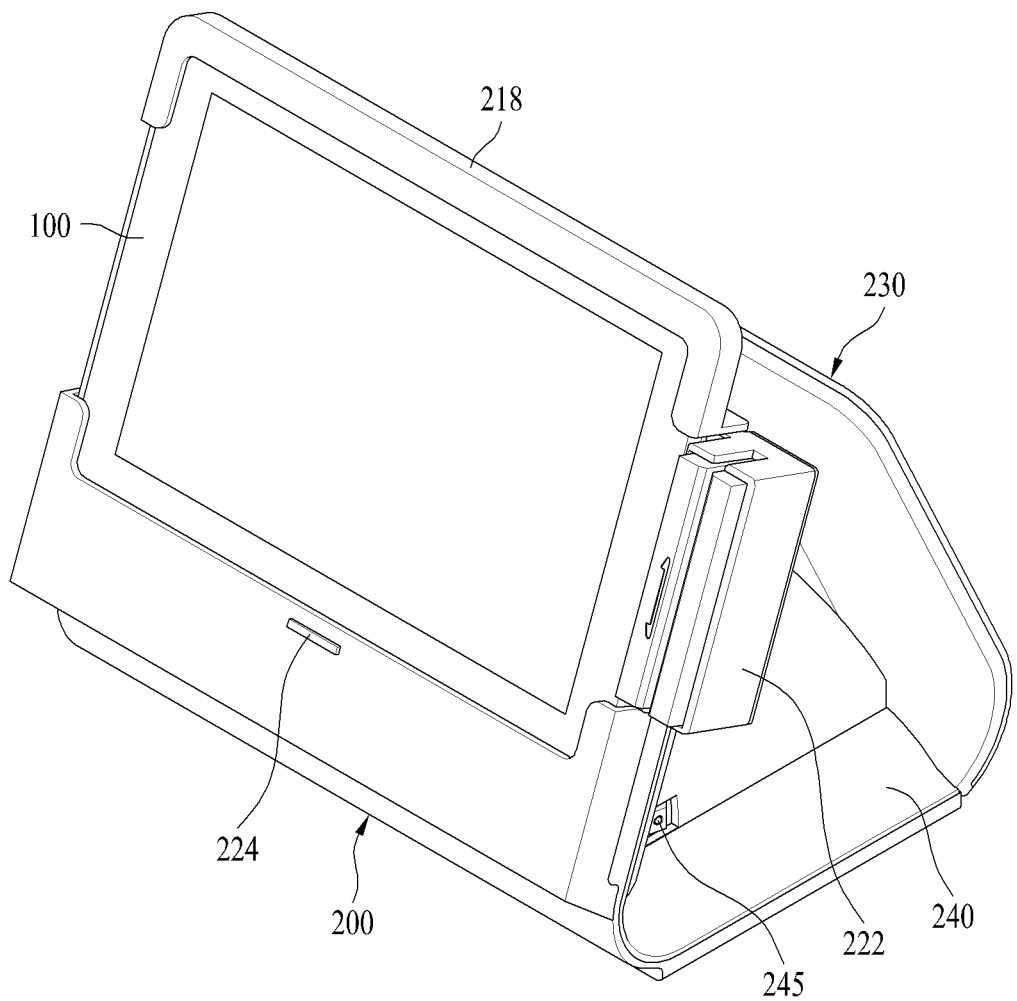
FIG. 4A is a perspective view depicting a POS terminal using a mobile terminal according to another exemplary embodiment of the invention.
Figure 4B:
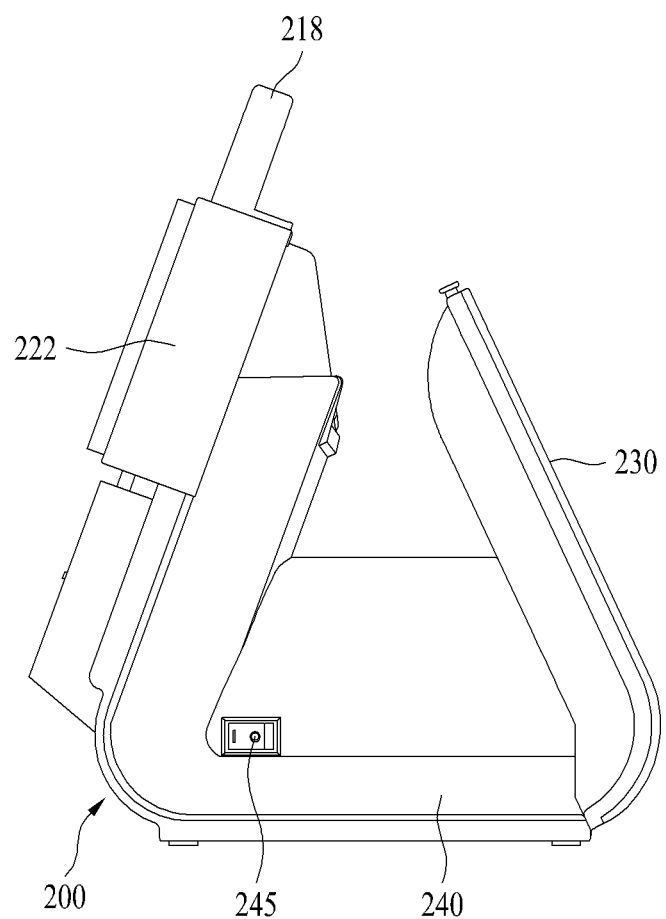
FIG. 4B is a side elevation view depicting the POS terminal using a mobile terminal according to another exemplary embodiment of the invention.
Figure 5:
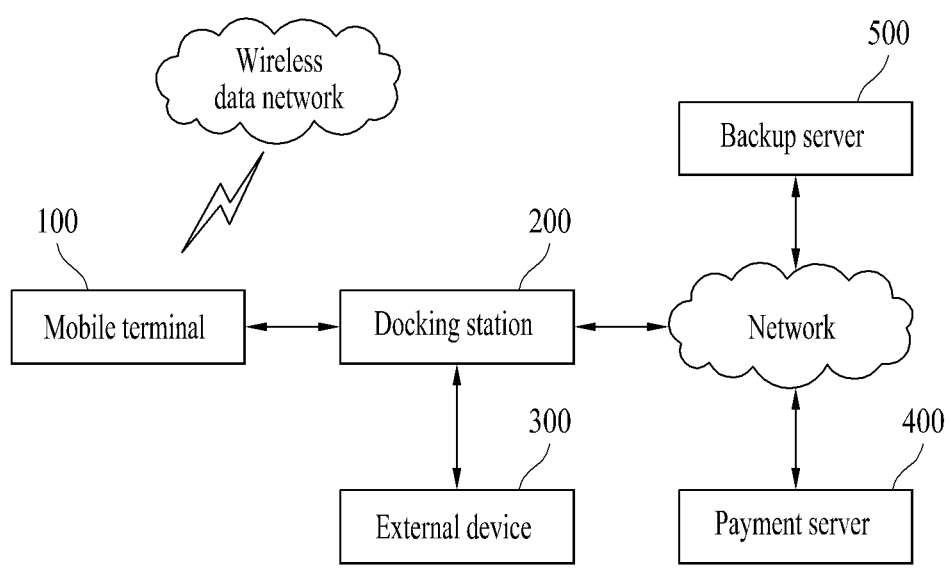
FIG. 5 is a configuration block diagram schematically depicting a POS system using a mobile terminal according to an exemplary embodiment of the invention.
Figure 6:
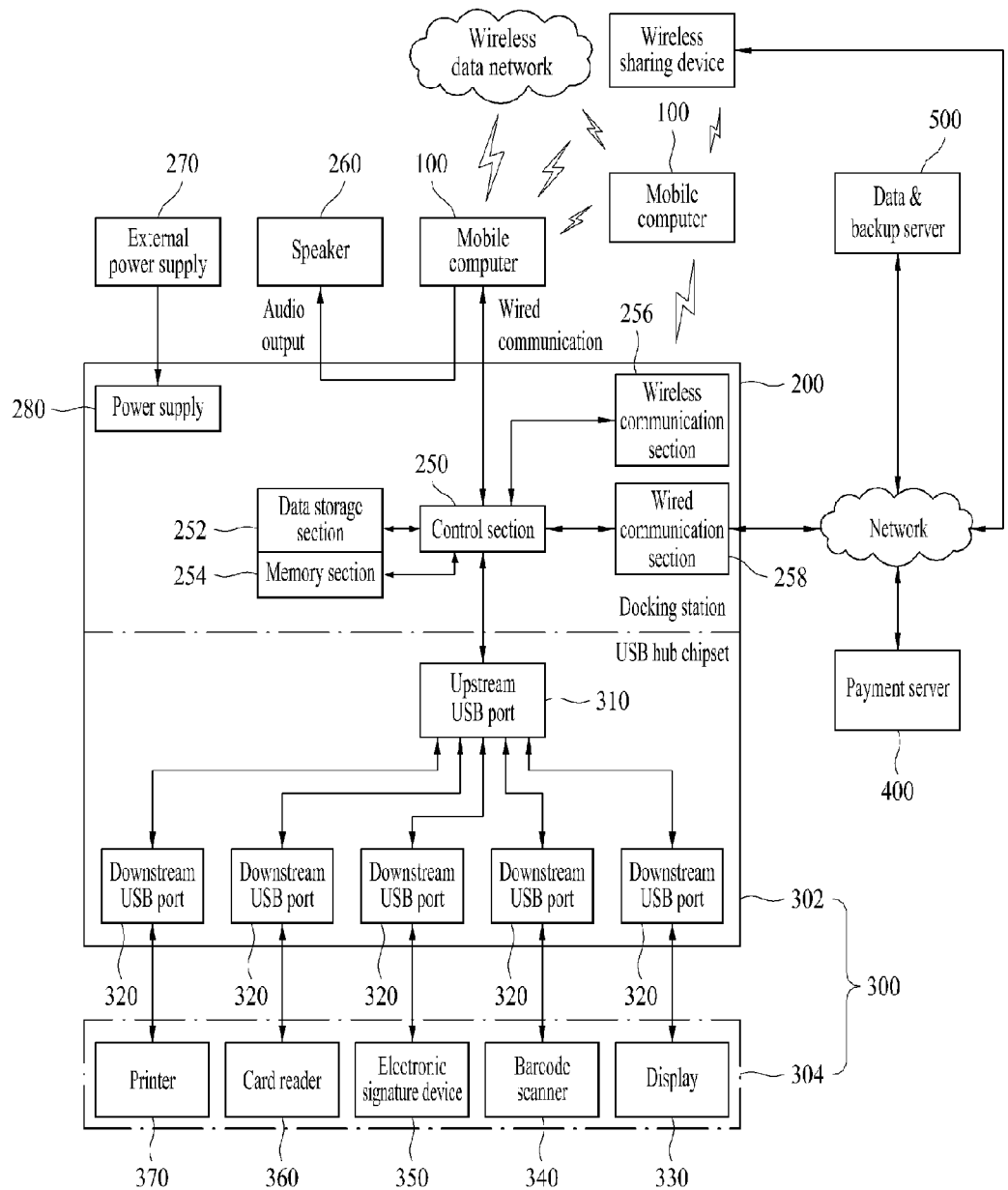
FIG. 6 is a configuration view depicting a docking state of a POS terminal using a mobile terminal according to an exemplary embodiment of the invention.

FIG. 1 is an exploded perspective view depicting a point-of-sale (POS) terminal using a mobile terminal according to an exemplary embodiment of the invention. FIG. 2 is an exploded perspective view depicting the POS terminal using a mobile terminal according to an exemplary embodiment of the invention. FIG. 3 is a rear perspective view depicting the POS terminal using a mobile terminal according to an exemplary embodiment of the invention. FIG. 4A is a perspective view depicting a POS terminal using a mobile terminal according to another exemplary embodiment of the invention, and FIG. 4B is a side elevation view depicting the POS terminal using a mobile terminal according to another exemplary embodiment of the invention. FIG. 5 is a configuration block diagram schematically depicting a POS system using a mobile terminal according to an exemplary embodiment of the invention. FIG. 6 is a configuration view depicting a docking state of a POS terminal using a mobile terminal according to an exemplary embodiment of the invention.

As shown in the figures, the POS terminal using a mobile terminal according to the invention includes a mounting means 210, on which the mobile terminal is placed, a docking station 200, to which the mounting means 210 is coupled, and which is connected to the mobile terminal via wires or wirelessly, and a display section 230, which is connected to the docking station 200.

The mounting means 210 is configured so as to fix the mobile terminal such that the mobile terminal, such as a tablet personal computer (PC) or a smart phone, can be mounted on the docking station 200.

The mounting means 210 includes a guide panel 212, which is open in the upper portion thereof, and is integrally connected to both side edges and the lower edge of the body of the mounting means 210. The guide panel 212 abuts the outer circumference of the mobile terminal, so that the mobile terminal can be guided to the mounting means 210. The mounting means 210 also includes a fixing cover 218, which closes the open upper portion of the guide panel 212, such that the mobile terminal can be fixed to the docking station, thereby preventing the mobile state from being lost or stolen.

The mounting means 210 of this embodiment is configured as one assembly that fixes the circumference of the mobile terminal, and is coupled to the docking station 200, which is configured so as to constitute a POS system using the mobile terminal. In addition, the fixing cover 218 is additionally provided on the upper portion of the mounting means 210, such that the mobile terminal can be more firmly fixed to the docking station 200 and be simply separated therefrom, so that a variety of sizes of the mobile terminal can be fixed to the docking station 200.

The mounting means 210 has coupling protrusions 216 formed on the rear portion thereof, such that the mounting means 210 can be coupled to the front portion of the docking station 200. In order to provide more reliable fixing force, the mounting means 210 has an insert recess 214 formed in the lower portion thereof, into which a connector 224 of the docking station 200 is to be inserted.

Specifically, the mounting means 210 enables the mobile terminal to be fixed thereto via the guide panel 212. Afterwards, the mounting means 210 to which the mobile terminal is mounted is firmly coupled to the docking station 20 via first coupling in which the coupling protrusions 216 formed on the rear portion of the mounting means 210 are fitted into coupling recesses 226 of the docking station 200, second fixing in which the connector 223 of the docking station 200 is fitted into the insert recess 214, and third fixing using the fixing cover 218.

The docking station 200 has a body 220 and a control section 250 inside the body 220. The body 220 is configured such that the mobile terminal mounted to the mounting means 210 is separably coupled thereto. The control section 250 is connected to the mobile terminal via wires or wirelessly, and interworks with a payment server 400 and a data backup server 500.

The body 220 has a support cover 228 on which the connector 224 is provided. A card reader 222 is provided on the body 220, adjacent to one side of the mobile terminal, and is directed forward. The card reader 222 is connected to the control section 250 via wires or wirelessly. The card reader 222 enables payment to be processed in real-time using a credit card or the like under the control of the mobile terminal and the control section 250.

In addition, the docking station 200 may be provided with a height-adjusting means 240, by which the height of the mounting means 210 can be adjusted.

Specifically, as shown in FIG. 3, a receiving section 249, in which the height-adjusting means 240 is to be received, is provided in the rear side of the mounting means 210. To the corresponding portion of the docking station 200, a hinge plate 242 is coupled. A hinge 244 is provided on the hinge plate 242 such that the hinge plate 242 can be rotatably coupled to the docking station 200. A support 246 is provided in the hinge 244. The support 246 is selectively fitted into the receiving section 249 depending on the height of the mobile terminal, which is mounted to the mounting means 210, so as to support the mounting means 210.

Here, according to an embodiment of the invention, the coupling recesses 226 of the docking station 200 preferably has the shape of a slot, by which the height of the mounting means 210 can be adjusted.

The docking station 200 is provided with a power supply 280, which is intended to supply power to the mobile terminal. The power supply 280 is provided with a power connector 245, which is connected to an external power supply 270. It is preferred that a rechargeable battery that is charged with electric power supplied from the outside be provided inside the power supply.

In addition, the docking station 200 is provided with connecting recesses 248, by which the docking station 200 is separably fixed to the display section 230, which will be described later, and is connected to the control unit 250.

The docking station 200 according to an embodiment of the invention collects various types of information provided from the POS system, and displays the information to a user. The docking station 200 sends input payment information to the payment server 400 via a network so that the payment information is approved by the payment server 400. The control section 250 stores the collected information in a data and backup server 500 so that the information can be reused.

This configuration can realize all functions that are required for a POS system. In addition, collected payment information can be stored in the mobile station or a data storage section 252 inside the docking station 200 in order to prevent the data from being lost. Furthermore, the system and the data can be easily restored when one of the systems malfunctioned.

In the docking station 200 according to an embodiment of the invention, due to the input/output function and the wired/wireless network function, the mobile terminal, which serves like a PC, is connected via wires or wirelessly to the control section 250 of the docking station 200. Then, the payment data is input and output, and the input data is connected to the payment server 400 via a wireless network, such as a wireless data network, or a wireless sharing device. The control section 250 of the docking station 200 communicates and processes data with peripheral devices 304 via a universal serial port (USB) hub chipset 302 and with the mobile terminal, and stores input/output data in the data storage section 252 or the data backup server 500.

The display section 230 is separably connected to the connecting recesses 248, which are provided in the rear portion of the docking station 200. The display section 230 outputs a receipt that is issued when the payment is processed via the mobile terminal so that the breakdown of the receipt can be inspected, outputs various types of advertisement, and acts as a signature pad on which a person who pays can sign.

The display section 230 includes a liquid crystal display (LCD) panel 232, which is implemented as an electrostatic touch screen, a front protective cover 234, which protects the LCD panel 232, and a rear protective cover 236. A connecting section 238, which connects the LCD panel 232 to the control section 250 of the docking station 200, protrudes from the rear protective cover 236.

As shown in FIG. 5 and FIG. 6, the POS system of the invention includes the docking station 200, to which a mobile terminal, such as a tablet PC or a smart phone, which can transmit payment data via a wireless network, is mounted. The POS system also includes a group of external devices 300, the payment server 400, and the data backup server 500. The group of external devices 300 includes a USB hub chipset 302, which is connected to the docking station 200, and peripheral devices 304. The payment server 400 transmits and receives payment data to and from a wireless communication section 256 and a wired communication section 258 via network, and verifies the payment data so that the payment is approved. The data backup server 500 interworks with the payment server 400, so that the payment data provided form the payment server 400 is stored therein.

Here, the group of external devices 300 includes the USB hub chipset 302 and the peripheral devices 302. The USB hub chipset 302 is configured such that it connects the control section 250 of the docking station 200 with the peripheral devices 304 in USB communication mode, which is a type of wired communication. The USB chipset 302 includes an upstream USB port 310, which is an upstream communication path, and a downstream USP port 320, which is a downstream communication path.

In addition, the group of peripheral devices 304 includes, but is not limited to, a display device 330, which displays a receipt or outputs an advertisement or a breakdown of transaction, or into which a signature can be input; a barcode scanner 340, which scans barcodes that contain information about a corresponding product; an electronic signature device 350, which receives a signature from a user; a card reader 360, which receives information about a card, such as a credit card, a check card, and a point card, so that payment is made; and a printer 370, which prints a receipt, information about a product, or print data, which is provided from the control section 250, the data storage section 252, the data backup server 500, or the like. The group of peripheral devices 304 may also include a variety of peripheral devices, which are part of a POS terminal, when such peripheral devices are connected via the USB hub chipset.

Furthermore, the control section 250, which is provided in the docking station 200, can establishes wired/wireless communication with the mobile terminal in order to input and output data into and from the mobile terminal, and includes the data storage section 252, into which payment data can be stored.

In addition, the control section 250 establishes a wired/wireless network with the payment server 400 and the data backup server 500, and controls the wireless communication section 256 and wired communication section 258 so that payment data can be approved or stored. A memory section 254 is also provided for the control section 250 to efficiently process data.

Here, the wireless communication section 256 of the docking station 200 is configured such that it enables the control section 250 to wirelessly communicate with the control section 250, the mobile terminal and the data backup server 500 via the wireless data network. The wired communication section 258 is configured such that it enables the control section 250 to communicate with the data backup server 500 or the payment server 400 via the network.

The power supply 280 is configured such that it supplies power to the system of the docking station and to the mobile terminal, and includes a rechargeable battery that can be connected to the external power supply 270 and be charged therefrom.

The speaker 260 serves to output an audio signal that is transmitted to the docking station 200 via the mobile terminal. Although the speaker 260 may be provided in the docking station 200, it may be implemented as a speaker that is provided on the mobile terminal and follows the control of the control section 250.

The mobile terminal may be connected to a network via a wireless sharing device or be wirelessly connected to a wireless data network, so that it can be provided with an advertisement from the Internet or a communication provider, and output it. The mobile terminal can also be provided with a program that is intended to realize a POS system, such as a POS application, and thus interwork with the control section 250 of the docking station 200 in order to realize a POS system.

Since the program, which is provided in the mobile terminal to realize a POS system, or the control unit 250, which is provided in the docking station 200, can record detailed information depending on items, such as product name, manufacturer, or price, via the POS terminal, it is possible to grasp information of products that are on sale. Since it is possible to grasp when and how many products were sold at a glance, the efficiency of physical distribution can be increased. In addition, it is possible to reduce the costs spent for the establishment of a POS system, and enable ordering, payment and management of sales information to be conducted irrespective of location, thereby maximizing user convenience. It is also possible to enable the general functions of a POS terminal, such as barcode scanning, NFC, signing, and the like, based on a variety of functions of a mobile terminal, in order to provide an optimum solution in any sales environment. Furthermore, it is possible to enable a manager to take orders while moving around a store and to conveniently conduct sales history management while he/she is moving or from other places out of the store, and to enable efficient power supply using a docking station.

In the figures, reference numeral "100" indicates the mobile terminal.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable those skilled in the art to make and utilize various exemplary embodiments of the present invention, as well as various alternatives and modifications thereof. It is intended that the scope of the invention be defined by the claims appended hereto and their equivalents.

What is claimed is:

1. A point-of-sale terminal comprising:
    a first display section including a mobile terminal;
    a mounting member comprising:
        a guide panel having an upper opening, right and left side edges, and a lower portion, wherein the mobile terminal including a tablet personal computer or a smart phone is mounted on the mounting member, and
        a fixing cover configured to prevent the mobile terminal from being lost or stolen and to close the upper opening of the guide panel;
    a second display section comprising:
        a panel having a first side and a second side,
        a first protective cover disposed on the first side of the panel, and
        a second protective cover disposed on the second side of the panel; and
    a docking station comprising a connector and a coupling recess by which the mounting member is separably coupled to the docking station, a power connection, by which power is supplied to the mobile terminal, and a connecting recess to which the second display section is connected,
    wherein an inside of the docking station is configured such that the docking station interworks with the mobile terminal via a wired communication or a wireless communication so that payment processing is performed,
    wherein the first display section is separably connected to the docking station,
    wherein the second display section is separably connected to the docking station,
    wherein the first display section and the second display section are facing opposite direction,
    wherein the second display section displays a receipt that is issued when the payment processing is performed via the mobile terminal, outputs various types of advertisement, and acts as a signature pad on which a person who pays is to sign,
    wherein the docking station further comprises a height-adjusting member for enabling a height of the mounting member to be adjusted, the height-adjusting member including a hinge plate, a hinge provided on the hinge plate, and a support fitted into a receiving member of the mounting member so as to support the mounting member, and
    wherein the coupling recesses has a slot which is configured to adjust the height of the mounting member.

2. The point-of-sale terminal of claim 1, wherein the mounting member comprises a coupling protrusion configured to be coupled to the coupling recess formed in the docking station, and an insert recess into which a connector formed in the docking station is to be inserted and a card reader is located on the docking station adjacent to one side of the mobile terminal.

3. The point-of-sale terminal of claim 1, wherein the docking station further comprises:
    a control section, which interworks with the mobile terminal via at least one of the wired communication and the wireless communication, collects information necessary for the payment processing, outputs the collected information, approves payment, and stores payment data;
    a wired/wireless communication section, whereby the wireless communication via a wireless data network or a wireless sharing device, or the wired communication is established between the control section and the mobile terminal, a payment server approving the payment, or a data backup server storing the payment data;
    a power supply, which supplies electric power to the mobile terminal;
    a speaker, which outputs an audio signal that is transferred to the docking station via the mobile terminal; and
    a universal serial bus hub chipset, which includes an upstream universal serial bus port for an upstream communication path and a downstream universal serial bus port for a downstream communication path, wherein a peripheral device including a display device, a barcode scanner, a card reader, or a printer, is connected to the universal serial bus hub chipset.

4. The point-of-sale terminal of claim 1, wherein the panel is a liquid crystal display panel having an electrostatic touch screen, and
    wherein the first and second protective covers protect the liquid crystal display panel, and connect the liquid crystal display panel to the control section of the docking station.

5. A point-of-sale system comprising:
    a first display section including a mobile terminal;
    a mounting member comprising:
        a guide panel having an upper opening, right and left side edges, and a lower portion, wherein the first display section including a tablet personal computer or a smart phone is mounted on the mounting member, and
        a fixing cover configured to prevent the first display section from being lost or stolen and to close the upper opening of the guide panel;
    a second display section comprising:
        a panel having a first side and a second side,
        a first protective cover disposed on the first side of the panel, and a second protective cover disposed on the second side of the panel; and a docking station comprising a connecter and a coupling recess by which the mounting member is separably connected to the docking station and a connecting recess to which the second display section is connected, wherein the first display section is separably connected to the docking station, wherein the second display section is separably connected to the docking station, and wherein the first display section and the second display section are facing opposite direction;

wherein the docking station further comprises a height-adjusting member for enabling a height of the mounting member to be adjusted, the height-adjusting member including a hinge plate, a hinge provided on the hinge plate, and a support fitted into a receiving member of the mounting member so as to support the mounting member;

an external device, which includes a universal serial bus hub chipset and peripheral devices connected to the docking station;

a payment server, which receives payment data from the docking station via a network, and verifies the payment data so that a payment is approved; and a data backup server, which interworks with the payment server via the network, and stores therein payment data provided from the payment server, wherein the docking station comprises:

a control section which interworks with the mobile terminal via at least one of a wired communication and a wireless communication, collects information necessary for the payment processing, outputs the collected information, approves the payment, and stores payment data;

a wireless communication section, whereby the control section establishes wireless communication with the mobile terminal or the data backup server via a wireless data network;

a wired communication section, whereby the control section establishes the wired communication with the data backup server or the payment server via the network; and a power supply, which is connected to an external power supply in order to supply electric power to the docking station and to the mobile terminal, wherein the universal serial bus hub chipset includes an upstream universal serial bus port for an upstream communication path and a downstream universal serial bus port for a downstream communication path, wherein the mobile terminal and the data backup server is connected via the wireless data network, wherein the docking station is enabled to perform the wired communication and the wireless communication with the mobile terminal in order to input and output data to and from the mobile terminal, and wherein the docking station comprises a data storage section which stores the payment data therein, and a memory section which enables the control section to efficiently process data.

6. The point-of-sale system of claim 5, wherein the docking station comprises a speaker which outputs an audio signal that is transferred to the docking station via the mobile terminal.

7. The point-of-sale system of claim 5, further comprising a peripheral device which is connected to the docking station via the universal serial bus hub chipset, wherein the peripheral device comprises:

a display device which displays a receipt, outputs an advertisement or a breakdown of a transaction, or is configured to act as a signature pad;

a barcode scanner, which scans barcodes that contain information about a product;

an electronic signature device, which receives a signature from a user;

a card reader, which receives card information so that the payment is made; and a printer, which prints the receipt, the information about the product, or prints data provided from the control section, the data storage section and the data backup server.

8. The point-of-sale system of claim 5, wherein the mobile terminal is connected to the network via a wireless sharing device or is wirelessly connected to the wireless data network, so as to output an advertisement provided from an Internet or a communication provider, is provided with a program that is intended to realize the point-of-sale system and interworks with the control section of the docking station in order to realize the point-of-sale system.

\* \* \* \* \*